(12) United States Patent
Yabe

(10) Patent No.: US 11,394,258 B2
(45) Date of Patent: Jul. 19, 2022

(54) ELECTRIC MOTOR, COMPRESSOR, FAN, AND REFRIGERATING AND AIR CONDITIONING APPARATUS

(71) Applicant: Mitsubishi Electric Corporation, Tokyo (JP)

(72) Inventor: Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 97 days.

(21) Appl. No.: 16/963,598

(22) PCT Filed: Mar. 12, 2018

(86) PCT No.: PCT/JP2018/009465
§ 371 (c)(1),
(2) Date: Jul. 21, 2020

(87) PCT Pub. No.: WO2019/175927
PCT Pub. Date: Sep. 19, 2019

(65) Prior Publication Data
US 2021/0066979 A1 Mar. 4, 2021

(51) Int. Cl.
*H02K 1/27* (2022.01)
*H02K 1/28* (2006.01)
(Continued)

(52) U.S. Cl.
CPC ......... *H02K 1/276* (2013.01); *F24F 1/00073* (2019.02); *F25B 31/02* (2013.01);
(Continued)

(58) Field of Classification Search
CPC .......... H02K 1/276; H02K 1/28; H02K 21/14; H02K 2213/03; H02K 2201/03;
(Continued)

(56) References Cited

U.S. PATENT DOCUMENTS

2009/0026865 A1 1/2009 Aota et al.
2012/0194108 A1* 8/2012 Kasaoka ............. H02P 21/0089
318/400.02

(Continued)

FOREIGN PATENT DOCUMENTS

JP H09-233750 A 9/1997
JP 2006-238667 A 9/2006
(Continued)

OTHER PUBLICATIONS

Indian Office Action dated Jan. 6, 2021 issued in corresponding IN Patent Application No. 202027031218.
(Continued)

*Primary Examiner* — Thomas Truong
(74) *Attorney, Agent, or Firm* — Posz Law Group, PLC

(57) ABSTRACT

An electric motor includes a rotor including a first rotor end and a second rotor end, and a stator including a first stator end and a second stator end. The first rotor end is located apart from the first stator end toward the first side. The second rotor end is located apart from the second stator end toward the first side. The relationship between the distances D1 and D2 satisfies D1>D2≥0, where D1 is a distance from a permanent magnet to a first end plate, and D2 is a distance from the permanent magnet to a second end plate. The thickness of each of a plurality of electrical steel sheets is not less than 0.1 mm and not more than 0.25 mm.

17 Claims, 12 Drawing Sheets

(51) Int. Cl.
*H02K 1/276* (2022.01)
*F24F 1/0007* (2019.01)
*F25B 31/02* (2006.01)
*H02K 21/14* (2006.01)

(52) U.S. Cl.
CPC .............. *H02K 1/28* (2013.01); *H02K 21/14* (2013.01); *H02K 2213/03* (2013.01)

(58) Field of Classification Search
CPC ........... H02K 1/32; H02K 9/19; H02K 21/16; H02K 7/14; H02K 1/27; H02K 1/16; H02K 15/03; F24F 1/00073; F25B 31/02; F04B 39/00
See application file for complete search history.

(56) References Cited

U.S. PATENT DOCUMENTS

| | | | |
|---|---|---|---|
| 2013/0270956 A1 | 10/2013 | Yamaguchi et al. | |
| 2013/0334907 A1* | 12/2013 | Ikuta | H02K 1/2706 310/45 |
| 2013/0334910 A1* | 12/2013 | Takahashi | H02K 9/22 310/52 |
| 2014/0021820 A1 | 1/2014 | Kondou et al. | |
| 2014/0232230 A1* | 8/2014 | Yabe | H02K 1/2706 310/156.11 |
| 2016/0072416 A1* | 3/2016 | Hirotani | H02P 25/022 318/400.02 |
| 2017/0179802 A1* | 6/2017 | Fujisue | H02K 1/02 |
| 2017/0310179 A1 | 10/2017 | Okouchi et al. | |
| 2018/0337570 A1* | 11/2018 | Yabe | F04C 29/0085 |
| 2019/0356185 A1* | 11/2019 | Yabe | F04D 25/0606 |

FOREIGN PATENT DOCUMENTS

| | | |
|---|---|---|
| JP | 2007-174738 A | 7/2007 |
| JP | 2013219970 A | 10/2013 |
| JP | 2015002650 A | 1/2015 |
| JP | 2016-086462 A | 5/2016 |
| WO | 2012132331 A1 | 10/2012 |

OTHER PUBLICATIONS

Office Action dated Mar. 9, 2022 in connection with counterpart Korean Patent Application No. 10-2020-7020478 (with Machine Translation).

* cited by examiner

ELECTRIC MOTOR, COMPRESSOR, FAN, AND REFRIGERATING AND AIR CONDITIONING APPARATUS

CROSS REFERENCE TO RELATED APPLICATION

This application is a U.S. national stage application of International Patent Application No. PCT/JP2018/009465 filed on Mar. 12, 2018, the disclosure of which is incorporated herein by reference.

TECHNICAL FIELD

The present invention relates to an electric motor including a permanent magnet.

BACKGROUND

As an electric motor in a highly efficient closed compressor used for a refrigeration cycle apparatus, a permanent magnet synchronous motor (also called a brushless DC motor) such as an interior permanent magnet motor is generally used. A permanent magnet or permanent magnets are disposed in a rotor core of a rotor of the permanent magnet synchronous motor. Heat is normally generated on the rotor core upon driving of the permanent magnet synchronous motor. When the heat generated on the rotor core is conducted to the permanent magnet, the temperature of the permanent magnet rises, and the permanent magnet thus demagnetizes. As a result, the torque and the efficiency of the electric motor problematically lower. Under the circumstances, a rotor that reduces the rise in temperature of a permanent magnet or permanent magnets by passing a refrigerant through the periphery of the permanent magnet has been proposed (see, for example, patent reference 1).

PATENT REFERENCE

Patent Reference 1: Japanese Patent Application Publication No. 2016-86462

In the conventional technique, however, since the permanent magnet of the rotor is cooled using the refrigerant, when a path through which the refrigerant passes is clogged, the permanent magnet cannot be sufficiently cooled. The rise in temperature of the permanent magnet of the rotor demagnetizes the permanent magnet. As a result, the efficiency of the electric motor problematically lowers.

SUMMARY

The present invention has been made to solve the above-described problem, and has as its object to improve the efficiency of the electric motor by reducing the rise in temperature of the permanent magnet of the rotor.

An electric motor according to the present invention includes a stator including a first stator end located on a first side in an axial direction, a second stator end located on a second side opposite to the first side in the axial direction, a tooth extending in a radial direction, and a winding wound around the tooth, and a rotor including a rotor core including a plurality of electrical steel sheets laminated in the axial direction, a magnet insertion hole, a first rotor end located on the first side, and a second rotor end located on the second side, a permanent magnet inserted in the magnet insertion hole, a shaft fixed to the rotor core and supported only on the second side, a first end plate covering the first side of the magnet insertion hole, and a second end plate covering the second side of the magnet insertion hole, wherein the first rotor end is located apart from the first stator end toward the first side in the axial direction, the second rotor end is located apart from the second stator end toward the first side in the axial direction, a relationship between a distance D1 and a distance D2 satisfies D1>D2≥0, where D1 is a distance from the permanent magnet to the first end plate, and D2 is a distance from the permanent magnet to the second end plate, and a thickness of each of the plurality of electrical steel sheets is not less than 0.1 mm and not more than 0.25 mm.

According to the present invention, the efficiency of the electric motor can be improved by reducing the rise in temperature of the permanent magnet of the rotor.

DETAILED DESCRIPTION

Embodiments of the present invention will be described in detail below with reference to the drawings.

In an x-y-z orthogonal coordinate system illustrated in each drawing, the z-axis direction (z-axis) indicates a direction parallel to an axis line A1 of a shaft 26 of an electric motor 1, the x-axis direction (x-axis) indicates a direction perpendicular to the z-axis direction (z-axis), and the y-axis direction (y-axis) indicates a direction perpendicular to both the z-axis direction and x-axis direction. The axis line A1 serves as the center of rotation of a rotor 2. The direction parallel to the axis line A1 will also be referred to as the "axial direction of the rotor 2" or simply as the "axial direction" hereinafter. A radial direction indicates a direction perpendicular to the axis line A1.

Embodiment 1

Figure 1:
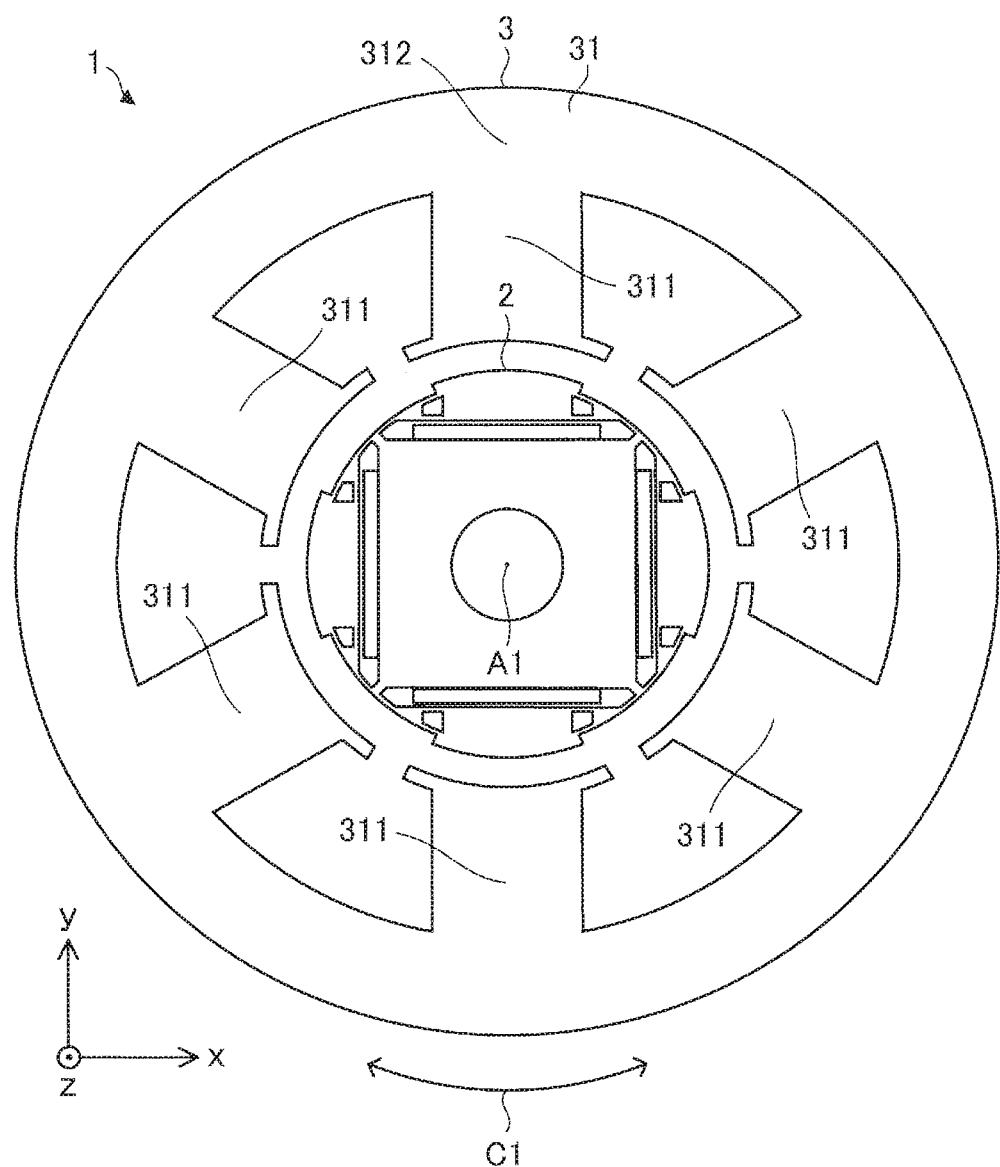
FIG. 1 is a plan view schematically illustrating a structure of an electric motor according to Embodiment 1 of the present invention.

FIG. 1 is a plan view schematically illustrating a structure of the electric motor 1 according to Embodiment 1 of the present invention. An arrow C1 indicates the circumferential direction of a stator 3 about the axis line A1. The arrow C1 also indicates the circumferential direction of the rotor 2 about the axis line A1. The circumferential direction of each of the rotor 2 and the stator 3 will also be simply referred to as the "circumferential direction" hereinafter.

Figure 2:
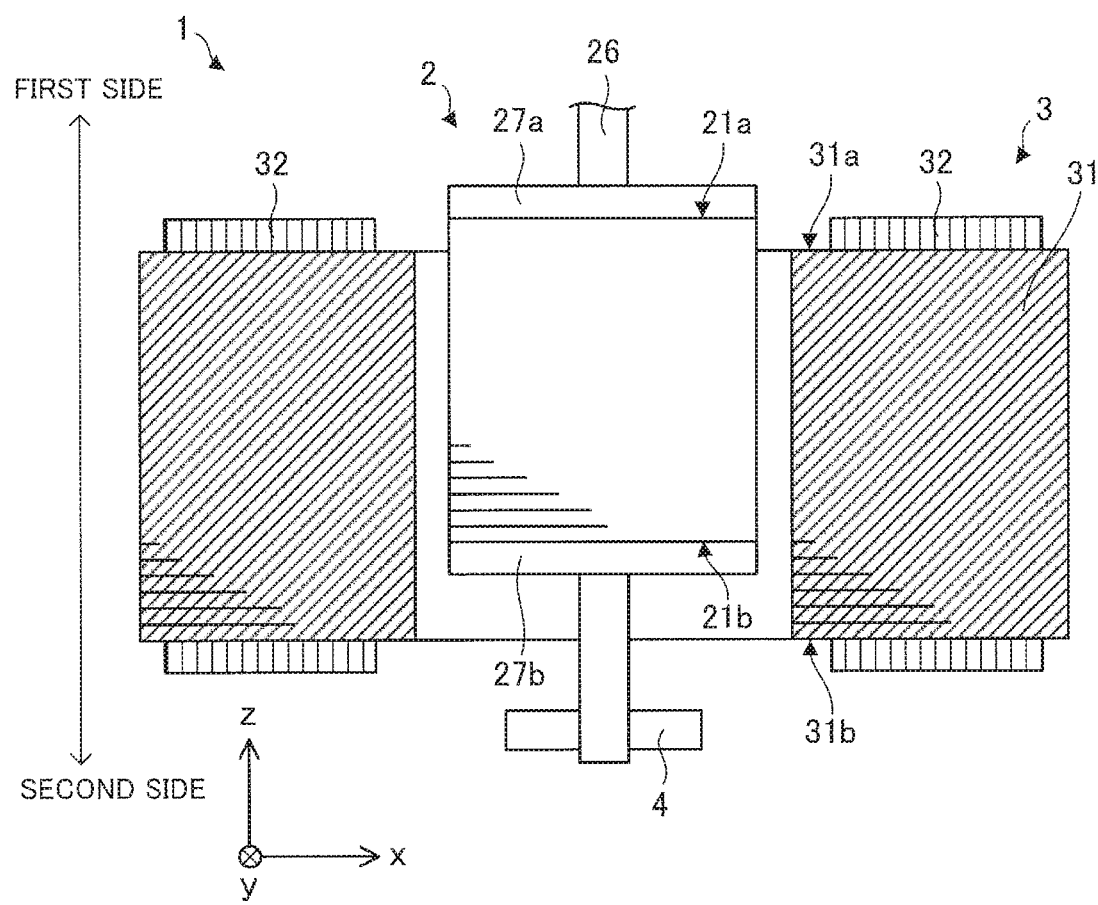
FIG. 2 is a partial sectional view schematically illustrating the structure of the electric motor.

FIG. 2 is a partial sectional view schematically illustrating the structure of the electric motor 1. FIG. 2 illustrates the outer appearance of the rotor 2, and a cross-section of the stator 3 in the x-z plane. The upper side (that is, the +z side) in FIG. 2 will be referred to as a first side hereinafter, and the lower side (that is, the −z side) in FIG. 2 will be referred to as a second side hereinafter.

The electric motor 1 includes the rotor 2, the stator 3, and a bearing 4. The electric motor 1 is, for example, an interior permanent magnet motor.

The stator 3 includes a stator core 31, a first stator end 31a located on the first side in the axial direction, a second stator end 31b located on the second side in the axial direction, and windings 32 wound on the stator core 31 (more specifically, teeth 311), as illustrated in FIG. 2. An insulator, for example, are interposed between the stator core 31 and the windings 32. In the stator 3 illustrated in FIG. 1, the windings 32 are omitted from the stator core 31.

The first stator end 31a is the end of the stator core 31 on the first side, and the second stator end 31b is the end of the stator core 31 on the second side.

The stator core 31 includes at least one tooth 311 extending in the radial direction, and a yoke 312 extending in the circumferential direction, as illustrated in FIG. 1. In the example illustrated in FIG. 1, the stator core 31 includes a plurality of teeth 311 (more specifically, six teeth 311).

The stator core 31 is formed annularly. The stator core 31 is formed by a plurality of electrical steel sheets laminated in the axial direction. Each of the plurality of electrical steel sheets is stamped into a predetermined shape.

Figure 3:
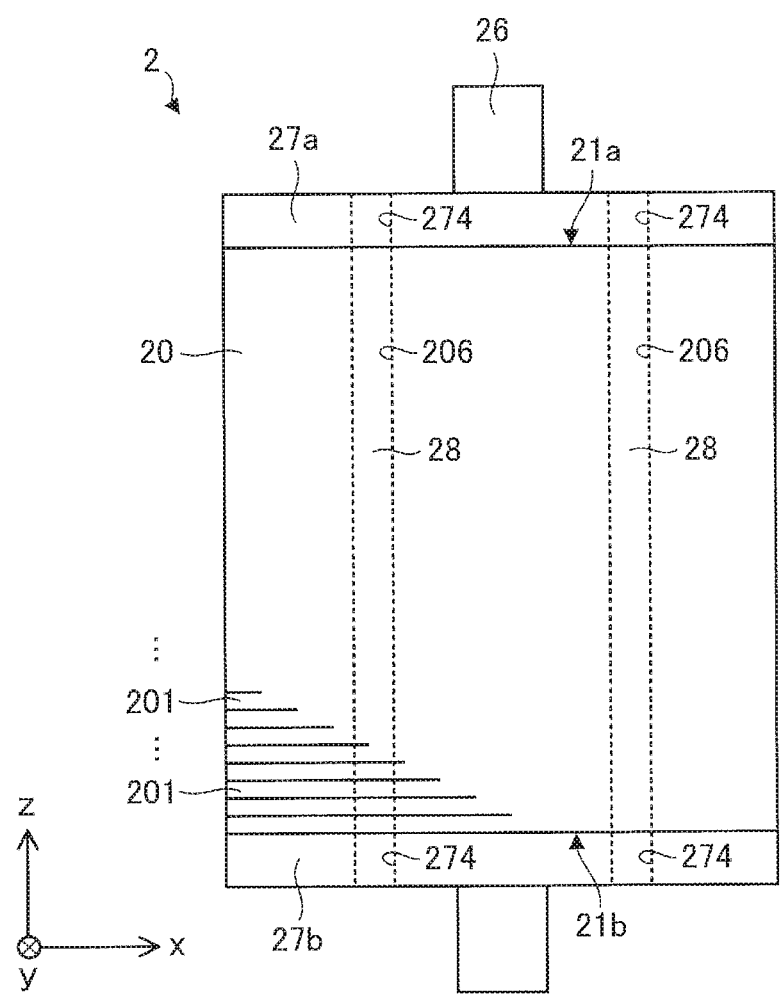
FIG. 3 is a side view schematically illustrating a structure of a rotor.

FIG. 3 is a side view schematically illustrating a structure of the rotor 2. The broken lines represented in FIG. 3 indicate inner walls defining fixing holes 206 and 274.

Figure 4:
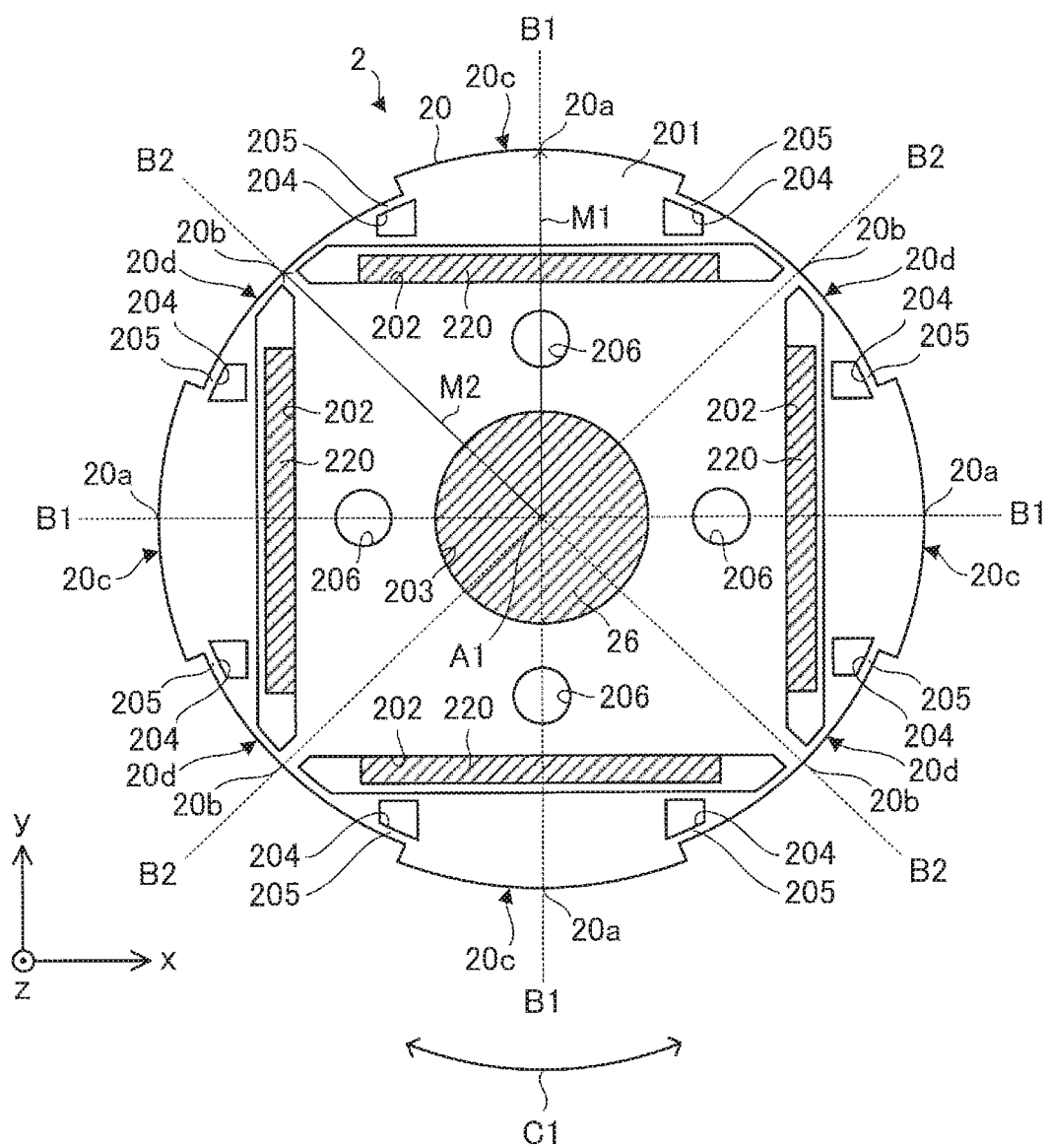
FIG. 4 is a sectional view schematically illustrating the structure of the rotor.

FIG. 4 is a sectional view schematically illustrating the structure of the rotor 2. Referring to FIG. 4, a first end plate 27a is omitted from a rotor core 20.

The rotor 2 is rotatably disposed inside the stator 3 in the radial direction. The rotor 2 includes the rotor core 20, at least one permanent magnet 220, the shaft 26, the first end plate 27a, a second end plate 27b, and at least one fixing member 28. The axis of rotation of the rotor 2 coincides with the axis line A1.

The rotor core 20 includes a plurality of electrical steel sheets 201 laminated in the axial direction, at least one magnet insertion hole 202, a shaft hole 203, at least one hole 204, at least one thin-wall portion 205, at least one fixing hole 206 (to be also referred to as a second fixing hole), a first rotor end 21a located on the first side, and a second rotor end 21b located on the second side. The rotor core 20 has a substantially cylindrical shape.

The first rotor end 21a is the end of the rotor core 20 on the first side in the axial direction, and the second rotor end 21b is the end of the rotor core 20 on the second side in the axial direction.

As illustrated in FIG. 3, the first end plate 27a covers the first side of the magnet insertion hole 202. The second end plate 27b covers the second side of the magnet insertion hole 202. The fixing members 28 are inserted in the fixing holes 206 of the rotor core 20 and the fixing holes 274 of the first end plate 27a and the second end plate 27b. The fixing members 28 fix the first end plate 27a and the second end plate 27b to the rotor core 20. With this configuration, the first end plate 27a and the second end plate 27b are fixed to the rotor core 20.

The thickness of each of the plurality of electrical steel sheets 201 is not less than 0.1 mm and not more than 0.25 mm. Each electrical steel sheet 201 is formed into a predetermined shape by stamping. The at least one magnet insertion hole 202, the shaft hole 203, the at least one hole 204, the at least one thin-wall portion 205, and the at least one fixing hole 206 are formed in the plurality of electrical steel sheets 201. The shaft hole 203 is formed at the centers of the electrical steel sheets 201, each in a plane perpendicular to the axial direction, that is, in the x-y plane.

In the example illustrated in FIG. 4, a plurality of magnet insertion holes 202 (more specifically, four magnet insertion holes 202) are arranged in the circumferential direction. Again in the example illustrated in FIG. 4, the number of magnet insertion holes 202 is equal to that of magnetic poles on the rotor 2.

The permanent magnets 220 are inserted in the magnet insertion holes 202. The permanent magnets 220 use, for example, rare-earth magnets. However, the permanent magnets 220 are not limited to the rare-earth magnets. The width of the permanent magnet 220 in the radial direction is smaller than the width of the magnet insertion hole 202 in the radial direction.

The permanent magnets 220 are located on an inner side with respect to the radial direction in the magnet insertion holes 202, as illustrated in FIG. 4. Therefore, voids are formed between the inner walls of the magnet insertion holes 202 and the outer surfaces of the permanent magnets 220 in the radial direction. Oil or a refrigerant may be present in these voids.

The at least one hole 204 is formed outside the magnet insertion hole 202 in the radial direction. In the example illustrated in FIG. 4, a plurality of holes 204 (more specifically, eight holes 204) are formed in the rotor core 20. Each hole 204 extends in the circumferential direction. Holes other than the holes 204 may be formed in the rotor core 20. In this case, the holes 204 are holes closest to inter-pole portions.

The at least one thin-wall portion 205 is formed between the hole 204 and the outer edge of the rotor core 20. In the example illustrated in FIG. 4, a plurality of thin-wall portions 205 (more specifically, eight thin-wall portions 205) are formed on the rotor core 20. Each thin-wall portion 205 extends in the circumferential direction.

The shaft 26 is inserted in the shaft hole 203 formed at the center of the rotor 2 in the x-y plane. The shaft 26 is fixed to the rotor core 20 (more specifically, the shaft hole 203) and rotatably supported only on the second side. More specifically, the shaft 26 is rotatably supported by the bearing 4 on the second side.

The rotor core 20 further includes first portions 20a located in magnetic pole center portions of the rotor 2, second portions 20b located in the inter-pole portions of the rotor 2, outer peripheral surfaces 20c (to be also referred to as first outer peripheral surfaces) including the first portions 20a, and outer peripheral surfaces 20d (to be also referred to as second outer peripheral surfaces hereinafter) including the second portions 20b.

In the x-y plane, the first portions 20a are ends of the rotor core 20 in the radial direction. Similarly, in the x-y plane, the second portions 20b are some other ends of the rotor core 20 in the radial direction. The first portions 20a and the second portions 20b form part of the outer edge of the rotor core 20.

The magnetic pole center portions are portions through which magnetic pole center lines B1 pass in the rotor 2. The magnetic pole center lines B1 indicated by broken lines are straight lines passing through the centers of the permanent magnets 220 and the center of rotation of the rotor 2 in the x-y plane.

The inter-pole portions are portions through which inter-pole lines B2 pass in the rotor 2. The inter-pole lines B2 indicated by broken lines are straight lines each passing through the midpoint between two permanent magnets 220 adjacent to each other and the center of rotation of the rotor 2 in the x-y plane.

The outer peripheral surfaces 20c project outward in the radial direction compared with the outer peripheral surfaces 20d. In the x-y plane, the distance from the center of rotation of the rotor 2 to the first portion 20a is larger than the distance from the center of rotation of the rotor 2 to the second portion 20b. In other words, the radius M1 of the rotor core 20 in the magnetic pole center portion is larger than the radius M2 of the rotor core 20 in the inter-pole portion. Therefore, the shortest distance from the second portion 20b to the stator core 31 is larger than the shortest distance from the first portion 20a to the stator core 31. In other words, an air gap between the rotor core 20 and the stator core 31 in the inter-pole portion is larger than an air gap between the rotor core 20 and the stator core 31 in the magnetic pole center portion.

Figure 5:
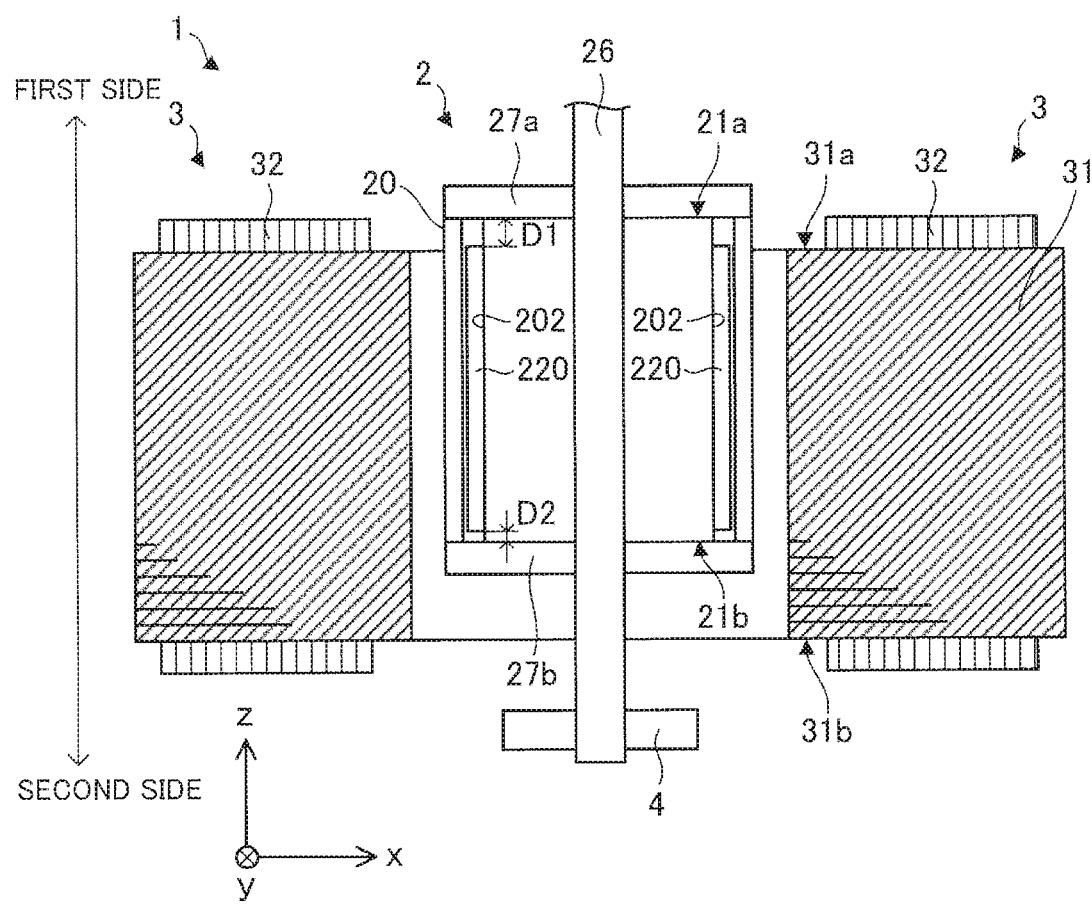
FIG. 5 is a diagram illustrating a positional relationship between the rotor and a stator in an x-z plane.

FIG. 5 is a diagram illustrating a positional relationship between the rotor 2 and the stator 3 in the x-z plane. FIG. 5 illustrates cross-sectional structures of the rotor 2 and the stator 3.

As illustrated in FIG. 5, the first rotor end 21a is located apart from the first stator end 31a toward the first side in the axial direction, and the second rotor end 21b is located apart from the second stator end 31b toward the first side in the axial direction.

Letting D1 be the distance from the permanent magnet 220 to the first end plate 27a in the axial direction, and D2 be the distance from the permanent magnet 220 to the second end plate 27b in the axial direction, the relationship between the distances D1 and D2 satisfies D1>D2≥0. When the distance from the permanent magnet 220 to the first end plate 27a is not uniform, the distance D1 is the shortest distance from the permanent magnet 220 to the first end plate 27a. Similarly, when the distance from the permanent magnet 220 to the second end plate 27b is not uniform, the distance D2 is the shortest distance from the permanent magnet 220 to the second end plate 27b.

Figure 6:
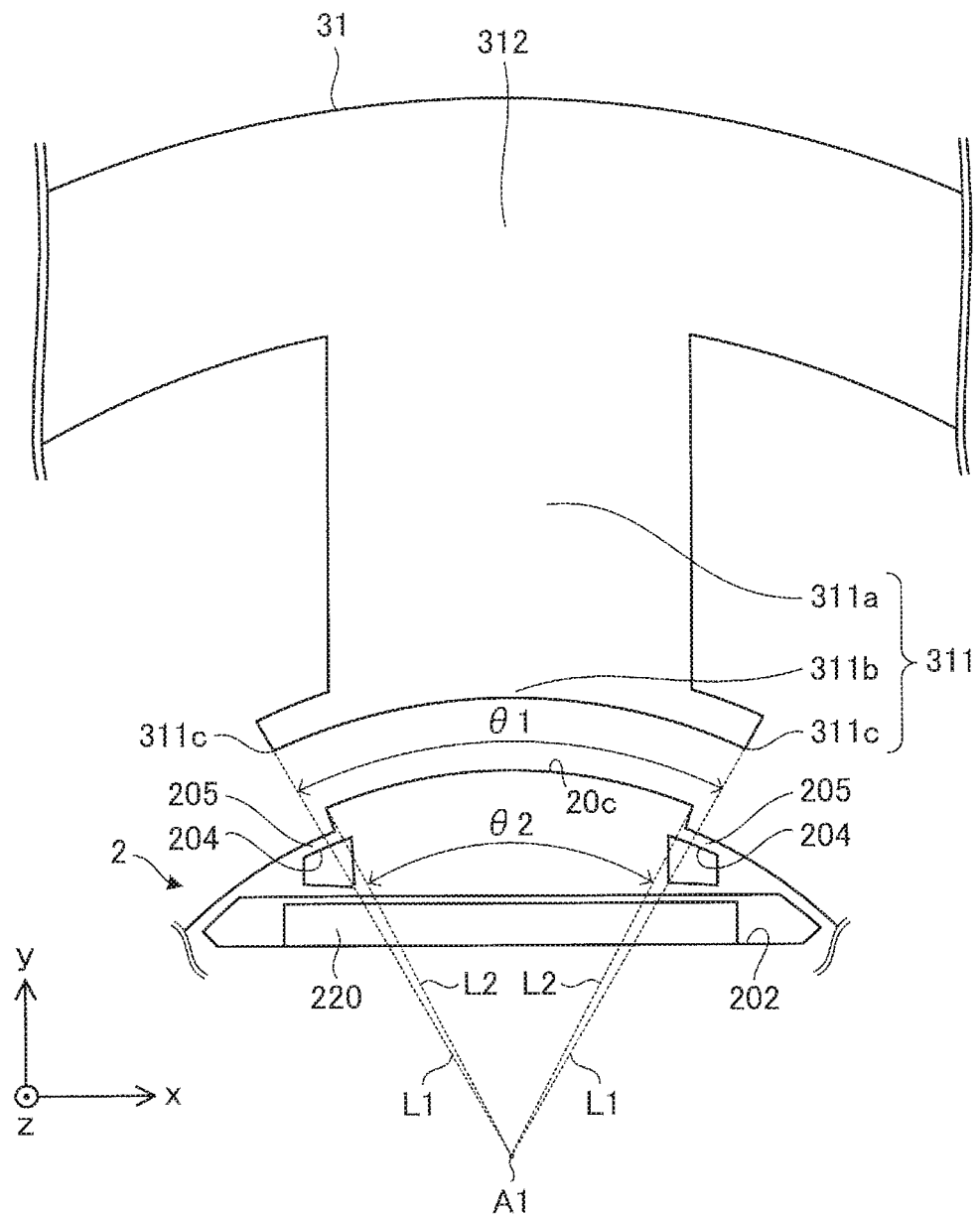
FIG. 6 is a diagram illustrating a positional relationship between the rotor and a stator core in an x-y plane.

FIG. 6 is a diagram illustrating a positional relationship between the rotor 2 and the stator core 31 in the x-y plane. FIG. 6 illustrates a part of the rotor 2 and a part of the stator core 31.

The tooth 311 includes a main body 311a and a tooth distal end 311b. Ends 311c are the ends of the tooth distal end 311b in the circumferential direction. The main body 311a extends in the radial direction. The tooth distal end 311b extends in the circumferential direction, and faces the rotor 2 (more specifically, the rotor core 20).

Each hole 204 is located on a straight line L1 passing through the axis line A1 (that is, the center of rotation of the rotor 2) and the end 311c of the tooth distal end 311b. Similarly, each thin-wall portion 205 is located on the straight line L1 passing through the axis line A1 and the end 311c of the tooth distal end 311b in the circumferential direction.

The electric motor 1 satisfies θ1≥θ2, where θ1 is the angle formed by two straight lines L1 passing through the both ends 311c of the tooth distal end 311b and the center of rotation of the rotor 2 in a plane perpendicular to the axial direction, that is, in the x-y plane, and θ2 is the angle formed by two straight lines L2 passing through the both ends of the outer peripheral surface 20c in the circumferential direction and the center of rotation of the rotor 2 in the x-y plane.

Figure 7:
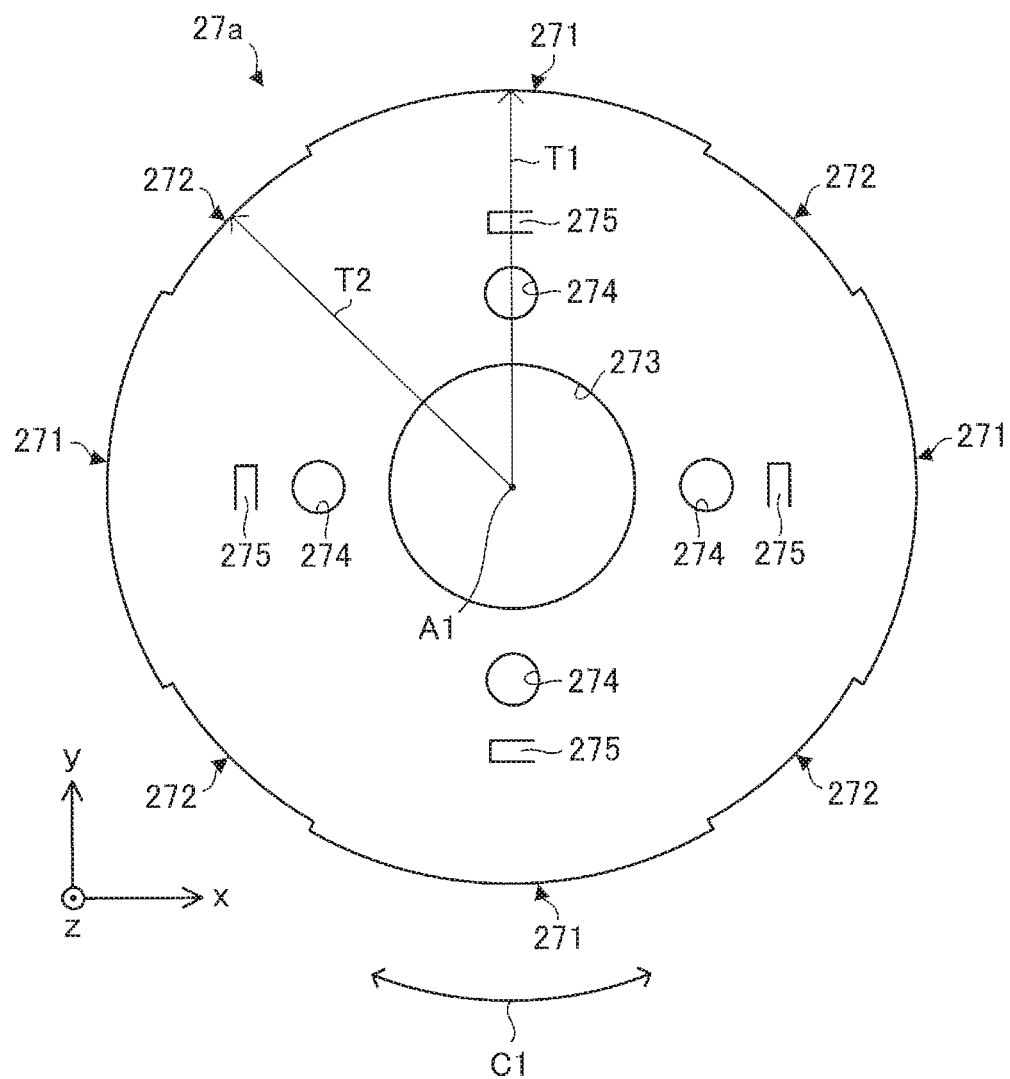
FIG. 7 is a plan view schematically illustrating a structure of a first end plate.

FIG. 7 is a plan view schematically illustrating a structure of the first end plate 27a. The structure of the second end plate 27b is the same as that of the first end plate 27a illustrated in FIG. 7.

The first end plate 27a includes outer edges 271 (to be also referred to as first outer edges) forming part of the outer edge of the first end plate 27a in the x-y plane, outer edges 272 (to be also referred to as second outer edges) adjacent to the outer edges 271 in the circumferential direction, a shaft hole 273 to pass the shaft 26 through it, at least one fixing hole 274 (to be also referred to as a first fixing hole), and at least one magnet fixing portion 275.

In the example illustrated in FIG. 7, a plurality of outer edges 271 (more specifically, four outer edges 271), a plurality of outer edges 272 (more specifically, four outer edges 272), a plurality of fixing holes 274 (more specifically, four fixing holes 274), and a plurality of magnet fixing portions 275 (more specifically, four magnet fixing portions 275) are formed on the first end plate 27a. The radius T1 of the first end plate 27a on the magnetic pole center portion of the rotor 2 is larger than the radius T2 of the first end plate 27a on the inter-pole portion of the rotor 2. The first end plate 27a and the second end plate 27b are made of, for example, nonmagnetic bodies.

Figure 8:
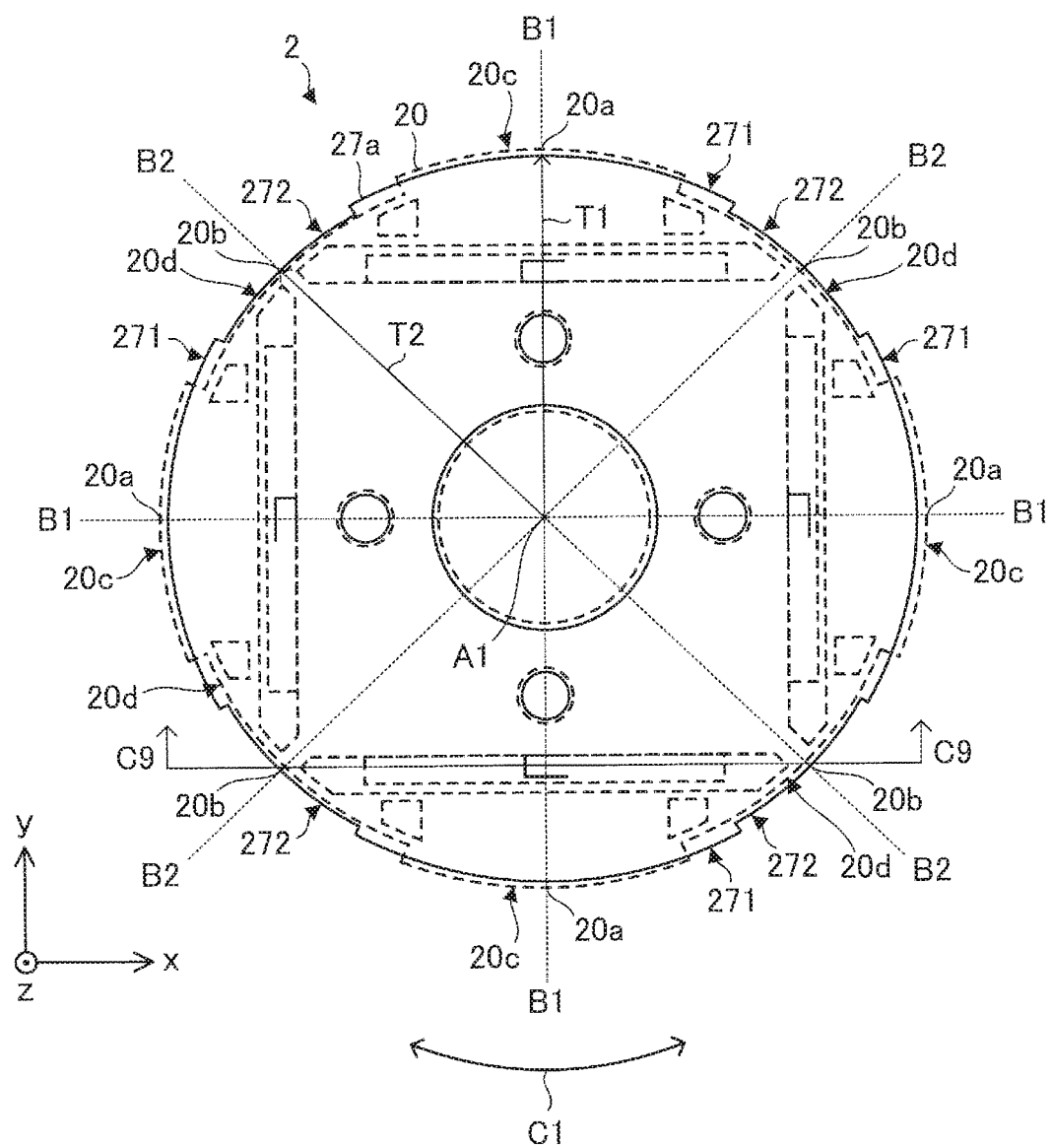
FIG. 8 is a plan view schematically illustrating the structure of the rotor 2.

FIG. 8 is a plan view schematically illustrating the structure of the rotor 2. In FIG. 8, the structure of the rotor core 20 is indicated by broken lines, and the structure of the first end plate 27a is indicated by solid lines.

Part of the outer edges 271 of the first end plate 27a are located on the magnetic pole center portions of the rotor 2, and part of the outer edges 272 of the first end plate 27a are located on the inter-pole portions of the rotor 2.

The outer edges 271 of the first end plate 27a are located apart from the outer peripheral surfaces 20c of the rotor core 20 inward in the radial direction. The outer edges 272 of the first end plate 27a are located apart from the outer peripheral surfaces 20d of the rotor core 20 outward in the radial direction. More specifically, on the magnetic pole center portions, the outer edges 271 of the first end plate 27a are located apart from the first portions 20a of the rotor core 20 inward in the radial direction. On the inter-pole portions, the outer edges 272 of the first end plate 27a are located apart from the second portions 20b of the rotor core 20 outward in the radial direction.

Figure 9:
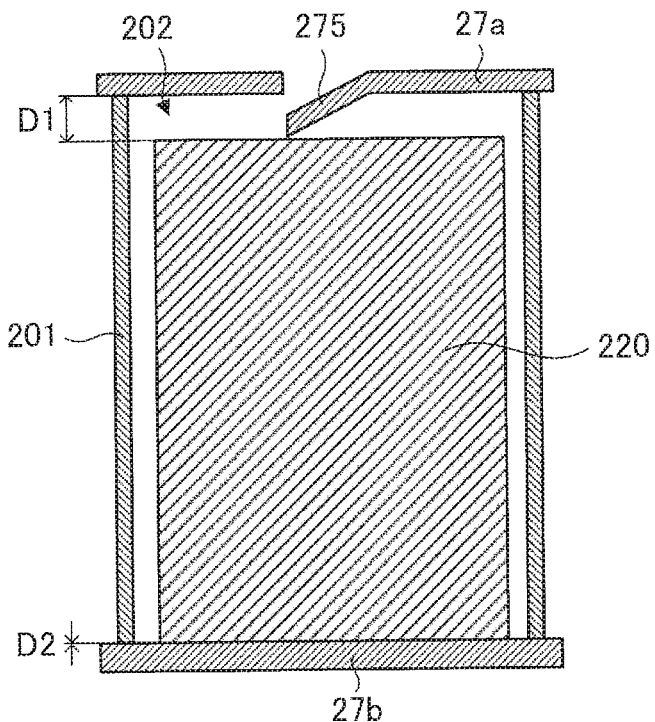
FIG. 9 is a sectional view taken along a line C9-C9 in FIG. 8.

FIG. 9 is a sectional view taken along a line C9-C9 in FIG. 8.

The magnet fixing portions 275 fix the positions of the permanent magnets 220. The magnet fixing portions 275 are, for example, projections having spring properties. The projections having spring properties can be formed by bending part of the first end plate 27a toward the permanent magnets 220, as illustrated in, for example, FIG. 9. In the example illustrated in FIG. 9, the positions of the permanent magnets 220 are fixed by the magnet fixing portions 275. In this case, the relationship between the distances D1 and D2 satisfies D1>D2 and D2=0.

Figure 10:
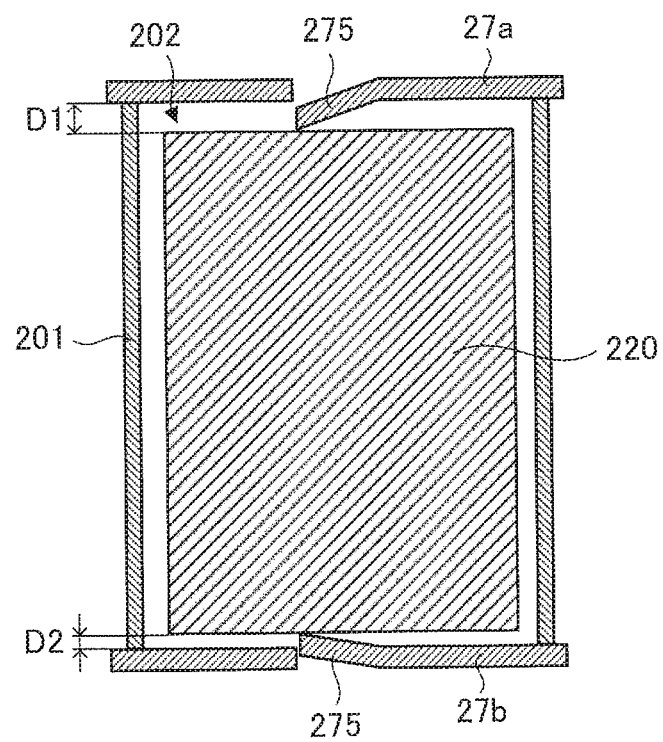
FIG. 10 is a diagram illustrating another example of a second end plate.

FIG. 10 is a diagram illustrating another example of the second end plate 27b.

The second end plate 27b may include the magnet fixing portions 275 to fix the positions of the permanent magnets 220. In the example illustrated in FIG. 10, the positions of the permanent magnets 220 are fixed by the magnet fixing portions 275 of the first end plate 27a and the magnet fixing portions 275 of the second end plate 27b. In this case, the length of the magnet fixing portion 275 of the first end plate 27a in the axial direction is larger than the length of the magnet fixing portion 275 of the second end plate 27b in the axial direction. Hence, the relationship between the distances D1 and D2 satisfies D1>D2>0.

Since the permanent magnets 220 are fixed in position in the axial direction by the magnet fixing portions 275, it is possible to prevent the permanent magnets 220 from shifting in the axial direction during driving of the electric motor 1 and to reduce variations in magnetic flux in the axial direction flowing into the stator 3. This makes it possible to improve the efficiency of the electric motor 1. Furthermore, even if the magnet insertion holes 202 or the permanent magnets 220 have dimensional errors in the axial direction, the magnet fixing portions 275 can absorb the errors because of their spring properties.

The fixing holes 206 of the rotor core 20, the fixing holes 274 of the first end plate 27a, and the fixing members 28 have circular shapes in the x-y plane. In the x-y plane, letting r1 be the radius of the fixing member 28, r2 be the radius of the fixing hole 274, r3 be the radius of the fixing hole 206, M1 be the radius of the rotor core 20 in the magnetic pole center portion, and T1 be the radius of the first end plate 27a on the magnetic pole center portion, their relationship satisfies r1<r2, r1<r3, and M1>T1.

The electric motor 1 further satisfies $(r2+r3)-2 \times r1 \leq M1-T1$.

Figure 11:
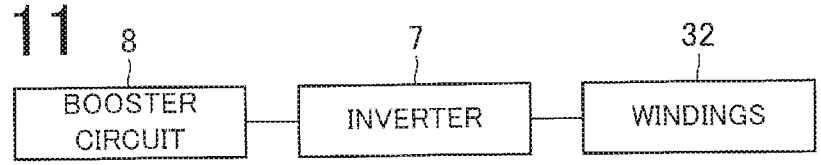
FIG. 11 is a block diagram illustrating an exemplary configuration of a driving system in the electric motor.

FIG. 11 is a block diagram illustrating an exemplary configuration of a driving system in the electric motor 1.

The electric motor 1 further includes an inverter 7 to apply a voltage to the windings 32, and a booster circuit 8 (also called a converter) to boost the voltage applied to the windings 32. When the electric motor 1 is driven, the carrier frequency for adjusting the voltage applied to the windings 32 is, for example, 1 kHz to 8 kHz. The carrier frequency may be controlled by the inverter 7, or may be controlled by a controller external to the inverter 7.

The effects of the electric motor 1 according to this Embodiment will be described below.

Generally, when a permanent magnet synchronous motor is driven, a voltage is applied to a stator (more specifically, windings), and a magnetic force is generated by the stator. Since the magnetic force from the stator contains harmonics (also called harmonic components), harmonics that are not synchronized with rotation of a rotor are present. These harmonics include a harmonic generated due to a current distortion generated in energizing the windings, and a harmonic generated due to slots that are spaces formed between teeth of the stator. The harmonics that are not synchronized with rotation of the rotor change magnetic flux in the rotor (more specifically, permanent magnets), and iron losses thus occur on the rotor. These iron losses occur on the surface of the rotor and then generate heat. When this heat is conducted to the permanent magnets through a rotor core, the temperature of the permanent magnets rises.

Generally, to increase the output of the electric motor, rare-earth magnets are used as the permanent magnets of the rotor. A rise in temperature of the rare-earth magnets causes reduction in the magnetic force and the coercive force, and thus causes reduction in the output and the efficiency of the electric motor. It is, therefore, desired to set the temperature of the permanent magnets as low as possible.

Since rare-earth magnets containing a low content of dysprosium are susceptible to heat, it is necessary to reduce the rise in temperature in a rotor in an electric motor using rare-earth magnets containing a low content of dysprosium. In particular, since the coercive force of permanent magnets containing no dysprosium is low, it is necessary to reduce the rise in temperature in the electric motor using rare-earth magnets containing a low content of dysprosium. When, therefore, the content of dysprosium in the permanent magnets is 4% or less by weight, it is important to reduce the rise in temperature of the permanent magnets. Conversely, using a technique capable of reducing the temperature of the permanent magnets, permanent magnets containing dysprosium at a content of 0% to 4% by weight can be used as the permanent magnets of the rotor.

Figure 12:
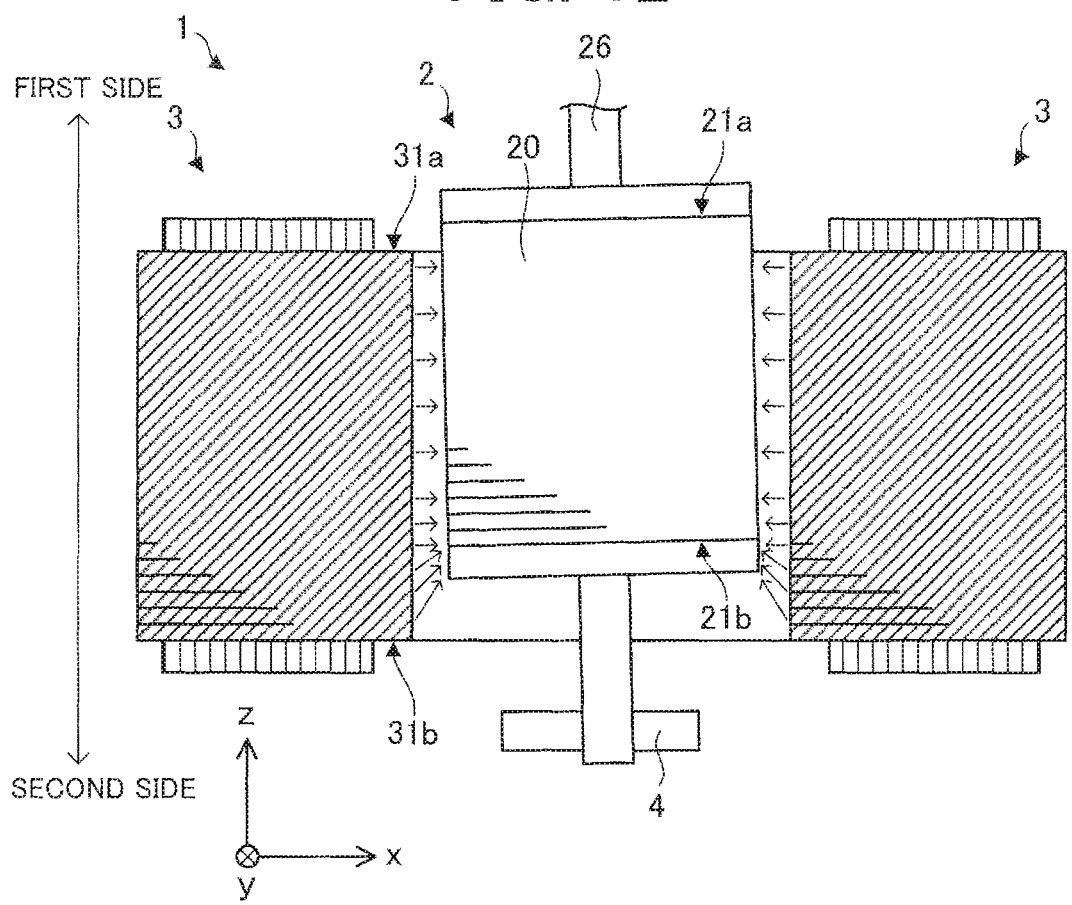
FIG. 12 is a diagram illustrating an exemplary state of the rotor during driving of the electric motor.

FIG. 12 is a diagram illustrating an exemplary state of the rotor 2 during driving of the electric motor 1. In FIG. 12, arrows illustrated in the air gap between the rotor 2 and the stator 3 indicate flows of magnetic flux from the stator 3.

Generally, when the shaft of the rotor is rotatably supported on one side in the axial direction, the shaft readily tilts during driving of the electric motor. When the shaft of the rotor tilts, a region in which the air gap between the rotor and the stator becomes narrow is generated. When the air gap between the rotor and the stator is narrow, since the density of magnetic flux flowing into the rotor core is high, the rotor core tends to be affected by the harmonics of the magnetic force from the stator. As a result, the iron loss on the surface of the rotor core increases. When, therefore, the shaft of the rotor is rotatably supported on one side in the axial direction, a large amount of heat is generated by the rotor core due to the iron loss.

In the electric motor 1, the shaft 26 of the rotor 2 is supported only on one end side in the axial direction, the first rotor end 21a is located apart from the first stator end 31a toward the first side in the axial direction, and the second rotor end 21b is located apart from the second stator end 31b toward the first side in the axial direction. The electric motor 1 having this structure is used as, for example, an electric motor for a rotary compressor.

When the electric motor 1 is applied to an electric motor for a rotary compressor, since the first rotor end 21a and the second rotor end 21b are located apart from the first stator end 31a and the second stator end 31b, respectively, toward the first side in the axial direction, an attractive force is produced in the axial direction in the electric motor 1. This makes it possible to control a clearance for compressing a refrigerant in the compressor.

As illustrated in FIG. 12, when the first rotor end 21a and the second rotor end 21b are located apart from the first stator end 31a and the second stator end 31b, respectively, toward the first side in the axial direction, magnetic flux from the stator 3 flowing into one end side of the rotor 2 in the axial direction increases. In the example illustrated in FIG. 12, magnetic flux from the stator 3 flowing into the second side of the rotor 2 increases. In this case, since the harmonic components of the magnetic force from the stator 3 are dominant, and the magnetic flux density of the rotor 2 on the second side increases, the iron loss of the rotor 2 on the second side increases. As a result, the temperature of the rotor 2 problematically rises. There is particularly a problem in that the temperature of the rotor 2 on the second side readily rises.

In the electric motor 1 according to this Embodiment, the relationship between the distances D1 and D2 satisfies D1>D2≥0. This makes it possible to reduce the volume of the permanent magnets 220 on the first side and to increase the area of the permanent magnets 220 facing the stator 3. As a result, the magnetic force of the permanent magnets 220 can be efficiently used, and the magnetic force of the rotor 2 can thus be strengthened.

When the permanent magnets 220 are in contact with the second end plate 27b (that is, D2=0), since the area of the permanent magnets 220 facing the stator 3 is largest, the magnetic force of the rotor 2 can be most effectively used. However, when the volume of the permanent magnets 220 on the second side of the rotor 2 is large, the temperature of the permanent magnets 220 on the second side readily rises. It is, therefore, desired to increase the volume of the permanent magnets 220 on the second side of the rotor 2, and to keep down the rise in temperature of the permanent magnets 220.

Figure 13:
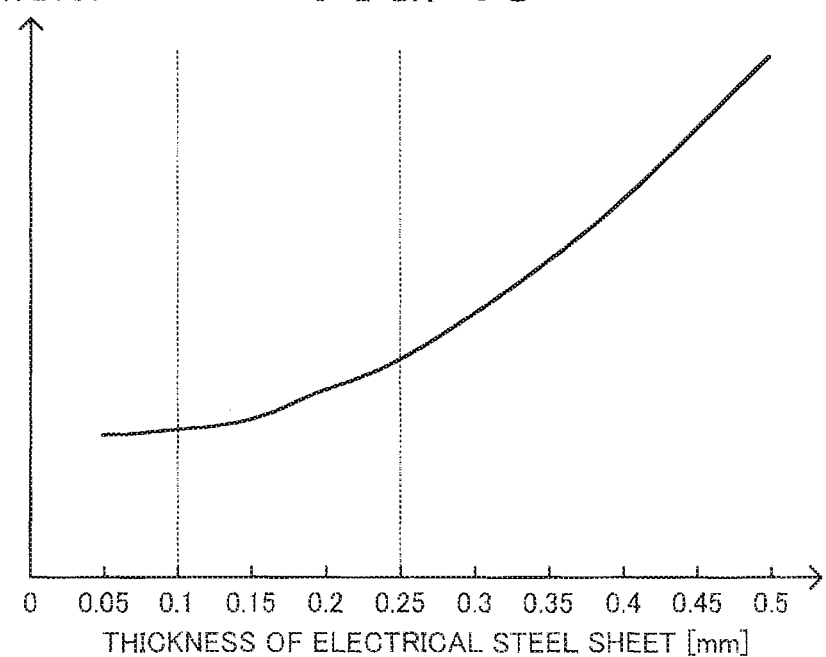
FIG. 13 is a graph representing a relationship between the thickness of an electrical steel sheet and the magnitude of iron loss generated on the rotor in the electric motor.

FIG. 13 is a graph representing a relationship between the thickness of the electrical steel sheet 201 and the magnitude of iron loss generated on the rotor 2 in the electric motor 1.

As illustrated in FIG. 13, when the thickness of the electrical steel sheet 201 is larger than 0.25 mm, the iron loss remarkably increases. Generally, the iron loss of an electrical steel sheet includes a hysteresis loss and an eddy current loss. To reduce the iron loss due to the harmonics of the magnetic force from the stator 3, it is effective to reduce the eddy current loss. When the thickness of the electrical steel sheet 201 is 0.25 mm or less, the iron loss, especially the eddy current loss, can be reduced. However, when the thickness of the electrical steel sheet 201 is smaller than 0.1 mm, it is difficult to stamp the electrical steel sheet 201. Therefore, the thickness of the electrical steel sheet 201 is desirably not less than 0.1 mm and not more than 0.25 mm.

In the electric motor 1 according to this Embodiment, since the magnetic flux from the stator 3 flowing into the second side of the rotor 2 increases, the temperature of the permanent magnets 220 on the second side readily rises, and their demagnetization characteristics are therefore prone to degradation. The use of magnets possessing high coercive force as the permanent magnets 220 makes it possible to improve the demagnetization characteristics. In the electric motor 1 according to this Embodiment, instead of using magnets possessing high coercive force, setting the thickness of the electrical steel sheet 201 to not less than 0.1 mm and not more than 0.25 mm makes it possible to reduce the iron loss generated on the rotor 2 and to reduce heat generated due to the iron loss. As a result, the rise in temperature of the permanent magnets 220 can be reduced.

The larger the angle θ2 (FIG. 6), the longer the region in which the air gap between the rotor 2 and the stator 3 is narrow can be formed to be in the circumferential direction, and thus magnetic flux from the permanent magnets 220 can efficiently flow into the stator 3. However, when the distance from the stator core 31 to the rotor core 20 is short, since the harmonics of the magnetic force from the stator core 31 exert a great influence, the iron loss on the rotor core 20 increases. In the electric motor 1 according to this Embodiment, the relationship between the angles θ1 and θ2 satisfies θ1≥θ2. This makes it possible to lessen the influence of the harmonics of the magnetic force from the stator 3. As a result, the magnetic force of the permanent magnets 220 can efficiently flow into the stator 3, and the iron loss generated on the surface of the rotor core 20 can thus be reduced.

The holes 204 (FIG. 4) of the rotor core 20 extend in the circumferential direction. This makes it possible to elongate the paths from the outer peripheral surface of the rotor core 20 to the permanent magnets 220 through the electrical steel sheets 201. As a result, since heat generated on the outer peripheral surface of the rotor core 20 is hard to be conducted to the permanent magnets 220, the rise in temperature of the permanent magnets 220 can be reduced. Furthermore, since the holes 204 are formed in the rotor core 20, the surface area of the rotor core 20 can be increased, and heat generated by the rotor core 20 and the permanent magnets 220 can be dissipated through the holes 204 to the exterior of the rotor 2.

The holes 204 of the rotor core 20 are located on the straight lines L1 passing through the axis line A1 (that is, the center of rotation of the rotor 2) and the ends 311c of the tooth distal end 311b in the circumferential direction. This makes it possible to reduce the harmonics of the magnetic force due to the structure of the tooth distal end 311b and the structure of the slot between two teeth 311, and to reduce the iron loss on the rotor 2.

The permanent magnets 220 are located on an inner side with respect to the radial direction in the magnet insertion holes 202. Therefore, voids are formed between the inner walls of the magnet insertion holes 202 and the outer surfaces of the permanent magnets 220 in the radial direction. With this configuration, heat generated on the outer peripheral surface of the rotor core 20 is hard to be conducted to the permanent magnets 220. As a result, the rise in temperature of the permanent magnets 220 can be reduced.

The radius T2 of the first end plate 27a on the inter-pole portion is larger than the radius M2 of the rotor core 20 in the inter-pole portion. In other words, the outer edges 272 are located apart from the second portions 20b of the rotor core 20 outward in the radial direction. This means that the volume of the first end plate 27a projecting outward from the second portions 20b of the rotor core 20 can be increased. This makes it possible to dissipate, through the first end plate 27a, heat generated by the rotor core 20 in the inter-pole portions. As a result, heat conducted from the rotor core 20 in the inter-pole portions to the permanent magnets 220 can be reduced.

The radius T1 of the first end plate 27a on the magnetic pole center portion is smaller than the radius M1 of the rotor core 20 in the magnetic pole center portion. In other words, the outer edges 271 are located apart from the first portions 20a of the rotor core 20 inward in the radial direction. This makes it possible to prevent the first end plate 27a from coming into contact with the stator core 31 and to reduce the distance from the rotor core 20 to the stator core 31 in the magnetic pole center portion. As a result, magnetic flux from the rotor 2 can efficiently flow into the stator core 31.

In the x-y plane, the amount of shift of the first end plate 27a with respect to the rotor core 20 is expressed as (r2−r1)+(r3−r1)=(r2+r3)−2×r1. Note that the maximum amount of movement between the fixing member 28 and the fixing hole 274 of the first end plate 27a is expressed as r2−r1, and the maximum amount of movement between the fixing member 28 and the fixing hole 206 of the rotor core 20 is expressed as r3−r1.

When, therefore, the electric motor 1 satisfies (r2+r3)−2×r1≤M1−T1, even if the first end plate 27a shifts due to the voids between the fixing members 28 and the fixing holes 206 and 274, the first end plate 27a can be mounted on the rotor core 20 so that the outer edges 271 of the first end plate 27a are located apart from the first portions 20a of the rotor core 20 inward in the radial direction. This shape prevents the first end plate 27a from falling outward in the radial direction of the rotor 2. With this configuration, the width of the space between the stator 3 and the rotor 2 in the radial direction can be determined by the outer peripheral surfaces 20c and 20d of the rotor 2. Therefore, the width of the space between the stator 3 and the rotor 2 in the radial direction can be set to a minimum dimension in consideration of, for example, decentering of the rotor 2, flexure of the shaft 26, and variations in shape. Under this condition, setting the radius T2 of the first end plate 27a on the inter-pole portion larger than the radius M2 of the rotor core 20 in the inter-pole portion makes it possible to increase the volume of the first end plate 27a projecting outward from the second portions 20b of the rotor core 20. This makes it possible to dissipate heat generated by the rotor core 20 in the inter-pole portions to the exterior of the rotor 2 through the first end plate 27a. As a result, heat conducted from the rotor core 20 in the inter-pole portions to the permanent magnets 220 can be reduced.

The air gap between the stator core 31 and the rotor core 20 in the inter-pole portions is larger than the air gap between the stator core 31 and the rotor core 20 in the magnetic pole center portions. With this arrangement, since the spatial harmonics of the stator 3 can be reduced, the iron loss generated on the surface of the rotor core 20 in the inter-pole portions can also be reduced. As a result, the rise in temperature of the permanent magnets 220 on the sides of the inter-pole portions can be reduced.

When the carrier frequency for adjusting a voltage applied to the windings 32 is high, the voltage applied to the windings 32, that is, a voltage for driving the electric motor 1 can be precisely adjusted, and the harmonic components of the magnetic force can thus be reduced. In the electric motor 1, the carrier frequency of the voltage applied to the windings 32 is, for example, 1 kHz to 8 kHz. This makes it possible to precisely adjust the voltage for driving the electric motor 1 and to reduce the harmonic components of the magnetic force.

Generally, the higher the carrier frequency, the higher the switching loss, and the lower the efficiency of the electric motor. When the carrier frequency in the electric motor 1 is 1 kHz to 8 kHz, the voltage for driving the electric motor 1 can be precisely adjusted in the state where the harmonics of the magnetic force from the stator 3 and the switching loss of the stator 3 are reduced. However, when the carrier frequency ranges from 1 kHz to 8 kHz, the iron loss generated due to the presence of the harmonics of the magnetic force from the stator 3 cannot be sufficiently kept low. Nevertheless, in the electric motor 1 according to this Embodiment, even when the carrier frequency ranges from 1 kHz to 8 kHz, since the structure described in this Embodiment is provided, the iron loss generated on the surface of the rotor core 20 can be reduced.

The electric motor 1 further includes a booster circuit 8 to boost the voltage applied to the windings 32. Generally, since the use of a booster circuit results in a high voltage, the modulation rate of the voltage is low when the electric motor is driven at a low rotation speed. When the modulation rate is low, the distortion of a current for driving the electric motor is large, and the harmonic components of the magnetic force caused by the current increase. As a result, the iron loss generated on the rotor increases. In the electric motor 1 according to this Embodiment, however, even when the booster circuit 8 is used, since the above-mentioned structure is provided, the iron loss generated on the surface of the rotor core 20 can be reduced.

In an electric motor in which the pulsation of the load is strong and equipped with no sensor to detect the position of a rotor, the features of the electric motor 1 according to this Embodiment are more effective. Generally, since an electric motor using a sensor to detect the position of a rotor can obtain the position of the rotor, the rotor can be controlled to be driven at a constant rotation speed even if the pulsation of the load on the electric motor is strong. In an electric motor equipped with no sensor to detect the position of a rotor, however, it is difficult to control the rotor to be driven at a constant rotation speed.

In an electric motor equipped with no sensor to detect the position of a rotor, for example, since a state occurs in which the fundamental wave of a magnetic force from a stator is not synchronized with the rotor, iron losses occur on the surface of a rotor core due to the fundamental wave of the magnetic force from the stator. As a result, the temperature of the rotor rises, and the temperature of permanent magnets rises. Since the electric motor 1 according to this Embodiment has the structure described in this Embodiment, even when the electric motor 1 is equipped with no sensor to detect the position of the rotor, the rise in temperature of the permanent magnets 220 can be reduced.

Regarding the pulsation of the load on the electric motor, when the ratio between the minimum value and the maximum value of the torque of the electric motor is 20% or more, a state is more likely to occur in which magnetic flux from the stator does not flow to an appropriate position with respect to the phase of the rotor. This phenomenon more remarkably occurs when the ratio between the minimum value and the maximum value of the torque of the electric motor is 50% or more. Generally, in an electric motor provided in a compressor for an air conditioner, the pulsation of the load is strong. In, for example, an electric motor provided in a rotary compressor, a ratio between the minimum value and the maximum value of the torque of 50% or more may occur. When, therefore, the electric motor 1 is used as an electric motor in a compressor, the features of the electric motor 1 according to this Embodiment are more effective.

As described above, in the electric motor 1, the first rotor end 21a is located apart from the first stator end 31a toward the first side in the axial direction, and the second rotor end 21b is located apart from the second stator end 31b toward the first side in the axial direction. Furthermore, the shaft 26 is fixed to the rotor core 20 (more specifically, the shaft hole 203), and rotatably supported only on the second side. Under these conditions, since the electric motor 1 has the structure described in this Embodiment, the rise in temperature of the permanent magnets 220 of the rotor 2 can be reduced, and the efficiency of the electric motor can thus be improved.

Embodiment 2

A compressor 6 according to Embodiment 2 of the present invention will be described below.

Figure 14:
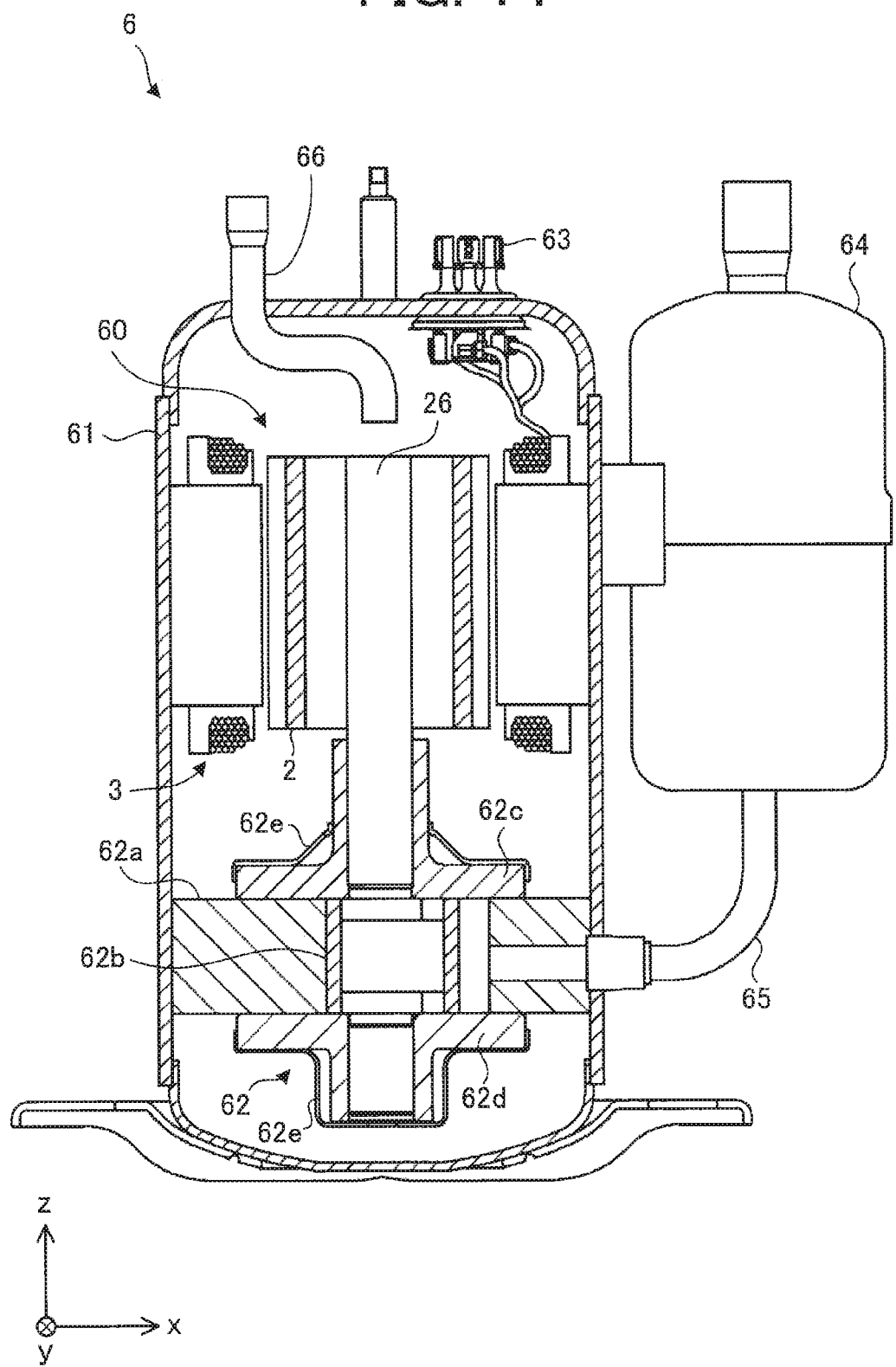
FIG. 14 is a sectional view schematically illustrating a structure of a compressor according to Embodiment 2 of the present invention.

FIG. 14 is a sectional view schematically illustrating a structure of the compressor 6 according to Embodiment 2.

The compressor 6 includes an electric motor 60 as an electric power element, a closed container 61 as a housing, and a compression mechanism 62 as a compression element. In this Embodiment, the compressor 6 is a rotary compressor. However, the compressor 6 is not limited to the rotary compressor.

The electric motor 60 is the electric motor 1 according to Embodiment 1. In this Embodiment, the electric motor 60 is designed as an interior permanent magnet motor, but it is not limited to this.

The closed container 61 covers the electric motor 60 and the compression mechanism 62. Freezer oil to lubricate the sliding portions of the compression mechanism 62 is stored at the bottom of the closed container 61.

The compressor 6 further includes a glass terminal 63 fixed to the closed container 61, an accumulator 64, a suction pipe 65, and a discharge pipe 66.

The compression mechanism 62 includes a cylinder 62a, a piston 62b, an upper frame 62c (first frame), a lower frame 62d (second frame), and a plurality of mufflers 62e respectively mounted on the upper frame 62c and the lower frame 62d. The compression mechanism 62 further includes a vane to separate the cylinder 62a into the suction and compression sides. The compression mechanism 62 is driven by the electric motor 60.

The electric motor 60 is fixed in the closed container 61 by press fitting or shrink fitting. The stator 3 may be directly mounted in the closed container 61 by welding instead of press fitting and shrink fitting.

Power is supplied to the windings of the stator 3 of the electric motor 60 via the glass terminal 63.

The rotor (more specifically, one end side of the shaft 26) of the electric motor 60 is rotatably supported by a bearing provided on the upper frame 62c and a bearing provided on the lower frame 62d.

The shaft 26 is inserted in the piston 62b. The shaft 26 is rotatably inserted in the upper frame 62c and the lower frame 62d. The upper frame 62c and the lower frame 62d close the end faces of the cylinder 62a. The accumulator 64 supplies a refrigerant (for example, a refrigerant gas) to the cylinder 62a via the suction pipe 65.

The operation of the compressor 6 will be described below. The refrigerant supplied from the accumulator 64 is drawn by suction into the cylinder 62a through the suction pipe 65 fixed to the closed container 61. The electric motor 60 rotates through applying an electric current to an inverter, and thus the piston 62b fitted to the shaft 26 rotates in the cylinder 62a. With this operation, the refrigerant is compressed in the cylinder 62a.

The refrigerant ascends in the closed container 61 through the mufflers 62e. The compressed refrigerant is mixed with the freezer oil. When the mixture of the refrigerant and the freezer oil passes through an air hole formed in the rotor core, separation between the refrigerant and the freezer oil is accelerated and thus the freezer oil can be prevented from flowing into the discharge pipe 66. In this way, the compressed refrigerant is supplied to the high-pressure side of a refrigeration cycle through the discharge pipe 66.

As the refrigerant for the compressor 6, R410A, R407C, R22, or the like, can be used. However, the refrigerant for the compressor 6 is not limited to these examples. As the refrigerant for the compressor 6, a low-GWP (Global Warming Potential) refrigerant, or the like, can be used.

As typical examples of the low-GWP refrigerant, the following refrigerants are given.

(1) An exemplary halogenated hydrocarbon having a carbon-carbon double bond in its composition is HFO-1234yf ($CF_3CF=CH_2$). HFO is an abbreviation of Hydro-Fluoro-Olefin. Olefin is an unsaturated hydrocarbon having only one double bond. The GWP of HFO-1234yf is 4.

(2) An example of hydrocarbon having a carbon-carbon double bond in its composition is R1270 (propylene). R1270 has the GWP of 3, which is lower than the GWP of HFO-1234yf, but R1270 is more flammable than HFO-1234yf.

(3) An example of a mixture containing at least one of a halogenated hydrocarbon having a carbon-carbon double bond in its composition or a hydrocarbon having a carbon-carbon double bond in its composition is a mixture of HFO-1234yf and R32. Since HFO-1234yf is a low-pressure refrigerant and therefore causes a considerable pressure loss, it readily degrades the performance of the refrigeration cycle (especially in an evaporator). It is, therefore, desired to use a mixture with, for example, R32 or R41, which is a high-pressure refrigerant.

The compressor 6 according to Embodiment 2 has the effects described in Embodiment 1.

Using the electric motor 1 according to Embodiment 1 as the electric motor 60, the efficiency of the electric motor 60 can be improved, and consequently the efficiency of the compressor 6 can be improved.

Embodiment 3

An air conditioner 50 (also called a refrigerating and air conditioning apparatus or a refrigeration cycle apparatus) according to Embodiment 3 of the present invention will be described below.

Figure 15:
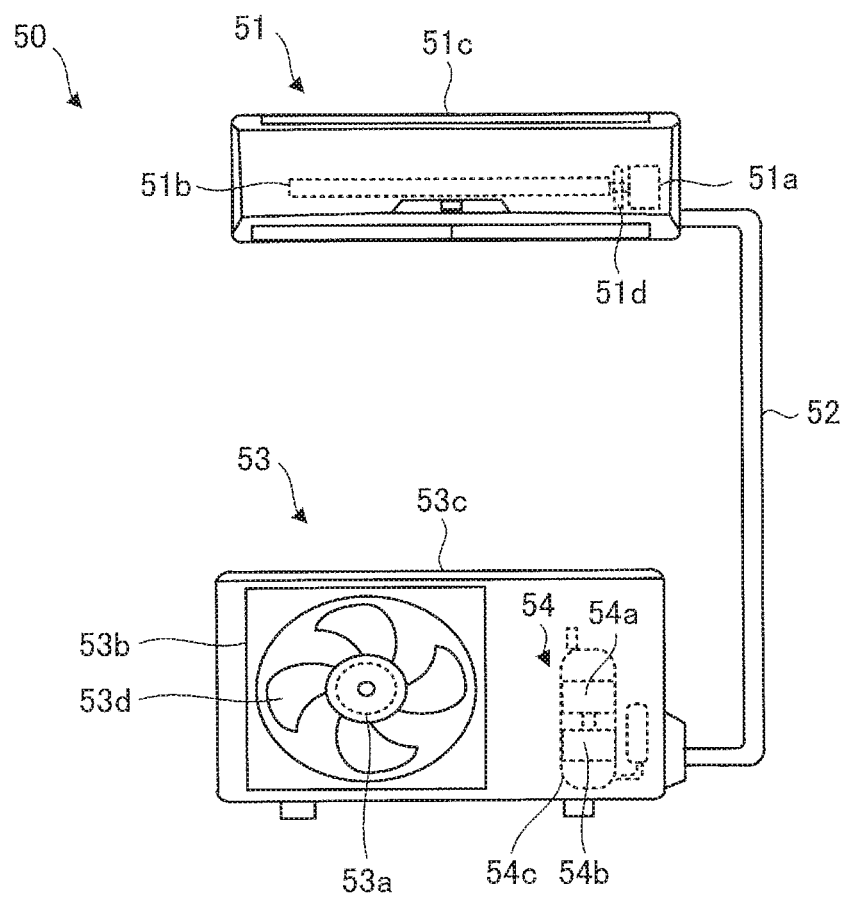
FIG. 15 is a diagram schematically illustrating a structure of an air conditioner according to Embodiment 3 of the present invention.

FIG. 15 is a diagram schematically illustrating a structure of the air conditioner 50 according to Embodiment 3 of the present invention.

The air conditioner 50 according to Embodiment 3 includes an indoor unit 51 as a fan (first fan), refrigerant piping 52, and an outdoor unit 53 as a fan (second fan) connected to the indoor unit 51 via the refrigerant piping 52.

The indoor unit 51 includes an electric motor 51a (for example, the electric motor 1 according to Embodiment 1), an air blower 51b driven by the electric motor 51a to blow air, and a housing 51c that covers the electric motor 51a and the air blower 51b. The air blower 51b includes, for example, blades 51d driven by the electric motor 51a. The blades 51d, for example, are fixed to a shaft (for example, the shaft 26) of the electric motor 51a and generate an air current.

The outdoor unit 53 includes an electric motor 53a (for example, the electric motor 1 according to Embodiment 1), an air blower 53b, a compressor 54, and a heat exchanger (not illustrated). The air blower 53b is driven by the electric motor 53a to blow air. The air blower 53b includes, for example, blades 53d driven by the electric motor 53a. The blades 53d, for example, are fixed to a shaft (for example, the shaft 26) of the electric motor 53a and generate an air current. The compressor 54 includes an electric motor 54a (for example, the electric motor 1 according to Embodiment 1), a compression mechanism 54b (for example, a refrigerant circuit) driven by the electric motor 54a, and a housing 54c that covers the electric motor 54a and the compression mechanism 54b. The compressor 54 is, for example, the compressor 6 described in Embodiment 2.

In the air conditioner 50, at least one of the indoor unit 51 or the outdoor unit 53 includes the electric motor 1 described in Embodiment 1. More specifically, as a driving source for the air blower, the electric motor 1 described in Embodiment 1 is applied to at least one of the electric motors 51a or 53a. As the electric motor 54a of the compressor 54, the electric motor 1 described in Embodiment 1 may be used.

The air conditioner 50 can perform an operation such as a cooling operation for blowing cold air from the indoor unit 51, or a heating operation for blowing hot air from the indoor unit 51. In the indoor unit 51, the electric motor 51a serves as a driving source for driving the air blower 51b. The air blower 51b can blow conditioned air.

With the air conditioner 50 according to Embodiment 3, since the electric motor 1 described in Embodiment 1 is applied to at least one of the electric motors 51a or 53a, the same effects as those described in Embodiment 1 can be obtained. This makes it possible to improve the efficiency of the air conditioner 50.

Using the electric motor 1 according to Embodiment 1 as a driving source for a fan (for example, the indoor unit 51), the same effects as those described in Embodiment 1 can be obtained. This makes it possible to improve the efficiency of the fan. A fan including the electric motor 1 according to Embodiment 1 and blades (for example, the blades 51d or 53d) driven by the electric motor 1 can be solely used as apparatus for blowing air. The fan is also applicable to apparatus other than the air conditioner 50.

Using the electric motor 1 according to Embodiment 1 as a driving source for the compressor 54, the same effects as those described in Embodiment 1 can be obtained. This makes it possible to improve the efficiency of the compressor 54.

The electric motor 1 described in Embodiment 1 can be mounted not only in the air conditioner 50, but also in apparatus including a driving source, such as a ventilating fan, a household electrical appliance, or a machine tool.

The features in the above-described Embodiments can be combined together as appropriate.

What is claimed is:

1. An electric motor comprising:
    a stator including a first stator end located on a first side in an axial direction, a second stator end located on a second side opposite to the first side in the axial direction, a tooth extending in a radial direction, and a winding wound around the tooth; and
    a rotor including a rotor core including a plurality of electrical steel sheets laminated in the axial direction, a magnet insertion hole, a first rotor end located on the first side, and a second rotor end located on the second side, a permanent magnet inserted in the magnet insertion hole, a shaft fixed to the rotor core and supported only on the second side, a first end plate covering the first side of the magnet insertion hole, and a second end plate covering the second side of the magnet insertion hole,
    wherein the first rotor end is located apart from the first stator end toward the first side in the axial direction,
    the second rotor end is located apart from the second stator end toward the first side in the axial direction,
    a relationship between a distance D1 and a distance D2 satisfies D1>D2≥0, where D1 is a distance from the permanent magnet to the first end plate, and D2 is a distance from the permanent magnet to the second end plate, and
    a thickness of each of the plurality of electrical steel sheets is not less than 0.1 mm and not more than 0.25 mm,
    wherein the rotor core includes a first portion located at an end of the rotor core in a radial direction and in a magnetic pole center portion of the rotor, and a second portion located at an end of the rotor core in a radial direction and in an inter-pole portion of the rotor, and in a plane perpendicular to the axial direction, a distance from a center of rotation of the rotor to the first portion is larger than a distance from the center of rotation of the rotor to the second portion, wherein
    the first end plate includes a first outer edge forming a part of an outer edge of the first end plate, and a second outer edge adjacent to the first outer edge in a circumferential direction,
    the first outer edge is located apart from the first portion inward in a radial direction, and
    the second outer edge is located apart from the second portion outward in a radial direction.

2. The electric motor according to claim 1, wherein
    the rotor core includes a first outer peripheral surface including the first portion, and a second outer peripheral surface including the second portion, and
    the first outer peripheral surface projects outward in a radial direction compared with the second outer peripheral surface.

3. The electric motor according to claim 2, wherein
    the tooth includes a tooth distal end facing the rotor, and
    the electric motor satisfies θ1≥θ2
    where θ1 is an angle formed by two straight lines passing through both ends of the tooth distal end in a circumferential direction and the center of rotation of the rotor in the plane perpendicular to the axial direction, and θ2 is an angle formed by two straight lines passing through both ends of the first outer peripheral surface in the circumferential direction and the center of rotation of the rotor in the plane.

4. The electric motor according to claim 3, wherein the rotor core includes a hole formed outside the magnet insertion hole in a radial direction, and the hole extends in a circumferential direction.

5. The electric motor according to claim 4, wherein the hole is located on a straight line passing through an end of the tooth distal end in a circumferential direction and the center of rotation of the rotor.

6. The electric motor according to claim 4, wherein the rotor core includes a thin-wall portion formed between the hole and an outer edge of the rotor core.

7. The electric motor according to claim 1, wherein
    a width of the permanent magnet in a radial direction is smaller than a width of the magnet insertion hole in the radial direction, and
    the permanent magnet is located on an inner side with respect to the radial direction in the magnet insertion hole.

8. The electric motor according to claim 1, wherein a carrier frequency for adjusting a voltage applied to the winding is 1 kHz to 8 kHz.

9. The electric motor according to claim 1, further comprising a booster circuit to boost a voltage applied to the winding.

10. A compressor comprising:
    the electric motor according to claim 1;
    a compression mechanism driven by the electric motor; and
    a housing covering the electric motor and the compression mechanism.

11. A fan comprising:
    the electric motor according to claim 1; and
    a blade driven by the electric motor.

12. A refrigerating and air conditioning apparatus comprising:
    an indoor unit; and
    an outdoor unit connected to the indoor unit,
    at least one of the indoor unit or the outdoor unit comprising the electric motor according to claim 1.

13. The electric motor according to claim 1, wherein
the stator comprises a stator core including the tooth, and
an air gap between the rotor core and the stator core in an inter-pole portion of the rotor is larger than an air gap between the rotor core and the stator core in a magnetic pole center portion of the rotor.

14. An electric motor comprising:
a stator including a first stator end located on a first side in an axial direction, a second stator end located on a second side opposite to the first side in the axial direction, a tooth extending in a radial direction, and a winding wound around the tooth; and
a rotor including a rotor core including a plurality of electrical steel sheets laminated in the axial direction, a magnet insertion hole, a first rotor end located on the first side, and a second rotor end located on the second side, a permanent magnet inserted in the magnet insertion hole, a shaft fixed to the rotor core and supported only on the second side, a first end plate covering the first side of the magnet insertion hole, and a second end plate covering the second side of the magnet insertion hole,
wherein the first rotor end is located apart from the first stator end toward the first side in the axial direction,
the second rotor end is located apart from the second stator end toward the first side in the axial direction,
a relationship between a distance D1 and a distance D2 satisfies D1>D2≥0, where D1 is a distance from the permanent magnet to the first end plate, and D2 is a distance from the permanent magnet to the second end plate, and
a thickness of each of the plurality of electrical steel sheets is not less than 0.1 mm and not more than 0.25 mm, wherein
the first end plate includes a first fixing hole,
the rotor core includes a second fixing hole,
the rotor includes a fixing member to fix the first end plate to the rotor core,
the fixing member is inserted in the first fixing hole and the second fixing hole, and
the electric motor satisfies (r2+r3)−2×r1≤M1−T1
where r1 is a radius of the fixing member, r2 is a radius of the first fixing hole, r3 is a radius of the second fixing hole, M1 is a radius of the rotor core in a magnetic pole center portion of the rotor, and T1 is a radius of the first end plate on the magnetic pole center portion.

15. A compressor comprising:
the electric motor according to claim 14;
a compression mechanism driven by the electric motor; and
a housing covering the electric motor and the compression mechanism.

16. A fan comprising:
the electric motor according to claim 14; and
a blade driven by the electric motor.

17. A refrigerating and air conditioning apparatus comprising:
an indoor unit; and
an outdoor unit connected to the indoor unit,
at least one of the indoor unit or the outdoor unit comprising the electric motor according to claim 14.

* * * * *